US012652120B2

(12) United States Patent
Cui et al.

(10) Patent No.: US 12,652,120 B2
(45) Date of Patent: Jun. 9, 2026

(54) WAVELENGTH CONFIGURATION APPARATUS AND SYSTEM, AND WAVELENGTH CONFIGURATION METHOD

(71) Applicant: Huawei Technologies Co., Ltd., Shenzhen (CN)

(72) Inventors: Binghua Cui, Chengdu (CN); Can Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 18/460,117

(22) Filed: Sep. 1, 2023

(65) Prior Publication Data

US 2023/0412298 A1     Dec. 21, 2023

Related U.S. Application Data

(63) Continuation of application No. PCT/CN2022/078863, filed on Mar. 2, 2022.

(30) Foreign Application Priority Data

Mar. 5, 2021   (CN) .......................... 202110245357.6

(51) Int. Cl.
H04J 14/02          (2006.01)

(52) U.S. Cl.
CPC .......... H04J 14/0227 (2013.01); H04J 14/02 (2013.01)

(58) Field of Classification Search
CPC .............................. H04J 14/02; H04J 14/0227

USPC ........................................................... 398/79
See application file for complete search history.

(56) References Cited

U.S. PATENT DOCUMENTS

| | | | | | |
|---|---|---|---|---|---|
| 8,989,574 | B2 * | 3/2015 | Kikuchi | ............. | H04B 10/0775 |
| | | | | | 398/33 |
| 2008/0025727 | A1 * | 1/2008 | Sakata | ................ | H04J 14/0227 |
| | | | | | 398/79 |
| 2012/0033974 | A1 * | 2/2012 | Ikai | ..................... | H04J 14/0226 |
| | | | | | 398/79 |
| 2018/0091251 | A1 * | 3/2018 | Hanneman, Jr. | .... | H04J 14/0256 |
| 2021/0167860 | A1 * | 6/2021 | Park | .................... | H04B 10/506 |
| 2021/0376948 | A1 * | 12/2021 | Park | .................... | H04J 14/0258 |
| 2023/0396902 | A1 * | 12/2023 | Yoshino | ............. | H04J 14/0307 |

FOREIGN PATENT DOCUMENTS

| | | | | |
|---|---|---|---|---|
| CN | 106911419 A | 6/2017 | | |
| EP | 3917045 A1 * | 12/2021 | .......... | H04J 14/0258 |

* cited by examiner

*Primary Examiner* — Amritbir K Sandhu
(74) *Attorney, Agent, or Firm* — Slater Matsil, LLP

(57) ABSTRACT

Embodiments of this application provide a wavelength configuration apparatus and system, and a wavelength configuration method. The wavelength configuration system includes an electrical signal processing apparatus and a multiplexer/demultiplexer apparatus. The multiplexer/demultiplexer apparatus sends an optical signal to indicate a specified wavelength to be configured by the electrical signal processing apparatus. The electrical signal processing apparatus automatically configures a wavelength of an optical transceiver interface after receiving the optical signal.

20 Claims, 8 Drawing Sheets

WAVELENGTH CONFIGURATION APPARATUS AND SYSTEM, AND WAVELENGTH CONFIGURATION METHOD

CROSS-REFERENCE TO RELATED APPLICATIONS

This application is a continuation of International Application No. PCT/CN2022/078863, filed on Mar. 2, 2022, which claims priority to Chinese Patent Application No. 202110245357.6, filed on Mar. 5, 2021. The disclosures of the aforementioned applications are hereby incorporated by reference in their entireties.

TECHNICAL FIELD

This application relates to the field of optical communication technologies, and in particular, to a wavelength configuration apparatus and system, and a wavelength configuration method.

BACKGROUND

A dense wavelength division multiplexing (DWDM) technology may transmit a group of light of different wavelengths by using an optical fiber, and can increase a transmission bandwidth of an optical fiber backbone network. More specifically, the DWDM technology multiplexes a tight spectral spacing of a single optical fiber carrier in one optical fiber to take advantage of achievable transmission performance (for example, to achieve minimal dispersion or attenuation). At a given information transmission capacity, a total number of optical fibers required can be reduced.

Currently, a typical DWDM networking structure includes a wavelength division multiplexing system electrical board (such as an optical transport unit (OTU) board), a multiplexer/demultiplexer board, an optical supervisory channel (OSC) board, and the like. A line port wavelength of the wavelength division multiplexing system electrical board needs to be strictly consistent with a port wavelength of the multiplexer/demultiplexer board. Otherwise, services in a DWDM system cannot be connected. Therefore, during deployment and networking, it is necessary to manually configure the line port wavelength of the wavelength division multiplexing system electrical board and manually configure the port wavelength of the multiplexer/demultiplexer board connected to the wavelength division multiplexing system electrical board, to ensure correct optical fiber connections. Currently, the line port wavelength of the wavelength division multiplexing system electrical board depends on manual configuration, which takes a long time and has a high probability of errors.

SUMMARY

Embodiments of this application provide a wavelength configuration apparatus and system, and a wavelength configuration method. The wavelength configuration method implements automatic wavelength configuration of a wavelength division multiplexing system electrical board, and helps to complete wavelength configuration more quickly and accurately.

According to a first aspect, embodiments of this application provide a wavelength configuration system. The wavelength configuration system includes an electrical signal processing apparatus and a multiplexer/demultiplexer apparatus. The multiplexer/demultiplexer apparatus is configured to send an optical signal to the electrical signal processing apparatus, where the optical signal indicates a specified wavelength to be configured by the electrical signal processing apparatus. The electrical signal processing apparatus is configured to obtain the specified wavelength indicated by the optical signal. The electrical signal processing apparatus is further configured to configure a wavelength of an optical transceiver interface connected to the multiplexer/demultiplexer apparatus in the electrical signal processing apparatus as the specified wavelength indicated by the optical signal.

After receiving the optical signal sent by the multiplexer/demultiplexer apparatus, the electrical signal processing apparatus automatically configures the wavelength of the corresponding optical transceiver interface. The wavelength configuration system does not need a complex and error-prone manual configuration process, and completes wavelength configuration more accurately in a shorter time.

In a possible design, the electrical signal processing apparatus is configured to obtain wavelength information carried in the optical signal. The wavelength information indicates the specified wavelength or an identifier of the specified wavelength. It can be learned that the electrical signal processing apparatus may obtain the specified wavelength or the identifier of the specified wavelength by using the wavelength information.

In a possible design, the wavelength information includes a start location and the specified wavelength. Alternatively, the wavelength information includes a start location and the identifier of the specified wavelength.

In a possible design, the wavelength information further includes a check location. It can be learned that the electrical signal processing apparatus may check demodulated wavelength information based on check information carried in the check location, thereby improving accuracy of the demodulated information.

In a possible design, the multiplexer/demultiplexer apparatus includes a single wavelength-adjustable light source. The wavelength-adjustable light source is configured to generate an optical signal indicating a specified wavelength. It can be learned that the multiplexer/demultiplexer apparatus may specify different wavelengths for different optical transceiver interfaces by using one wavelength-adjustable light source.

In a possible design, the multiplexer/demultiplexer apparatus includes a plurality of light sources. The plurality of light sources are configured to generate optical signals indicating specified wavelengths, and the optical signals indicating the specified wavelengths cover bands that do not completely overlap. It can be learned that the multiplexer/demultiplexer apparatus may further specify different wavelengths for different optical transceiver interfaces by using the plurality of light sources.

In a possible design, the multiplexer/demultiplexer apparatus further includes a multiplexer. The multiplexer is configured to combine the plurality of optical signals generated by the plurality of light sources. It can be learned that the multiplexer may be further added in the multiplexer/demultiplexer apparatus to couple the optical signals of the plurality of light sources to a same optical fiber for transmission.

According to a second aspect, embodiments of this application provide an electrical signal processing apparatus. The electrical signal processing apparatus includes a processor and an optical transceiver interface. The optical transceiver interface is configured to receive an optical signal from a multiplexer/demultiplexer apparatus. The optical signal indicates a specified wavelength to be configured by the electrical signal processing apparatus. The processor is configured to obtain the specified wavelength indicated by the optical signal. The processor is further configured to configure a wavelength of the optical transceiver interface connected to the multiplexer/demultiplexer apparatus in the electrical signal processing apparatus as the specified wavelength indicated by the optical signal.

It can be learned that, after receiving the optical signal sent by the multiplexer/demultiplexer apparatus, the electrical signal processing apparatus automatically configures the wavelength of the optical transceiver interface, thereby completing wavelength configuration more quickly and accurately.

In a possible design, the processor is configured to obtain wavelength information carried in the optical signal. The wavelength information includes a start location and the specified wavelength, or the wavelength information includes a start location and the identifier of the specified wavelength. The wavelength information may further include a check location. For the start location, the specified wavelength, the identifier of the specified wavelength, and the check location, refer to corresponding descriptions in the first aspect, and details are not described herein again.

According to a third aspect, embodiments of this application provide a multiplexer/demultiplexer apparatus. The multiplexer/demultiplexer apparatus includes a light source and an optical transceiver interface. The light source is configured to generate an optical signal. The optical signal indicates a specified wavelength to be configured by an electrical signal processing apparatus. The optical transceiver interface is configured to send an optical signal to the electrical signal processing apparatus.

It can be learned that the multiplexer/demultiplexer apparatus indicates the specified wavelength to the electrical signal processing apparatus by using the optical signal, which helps the electrical signal processing apparatus automatically configure a wavelength of the optical transceiver interface as the specified wavelength.

In a possible design, the multiplexer/demultiplexer apparatus further includes a processor. The processor is configured to generate wavelength information, where the wavelength information includes a start location and the specified wavelength, or the wavelength information includes a start location and the identifier of the specified wavelength. The wavelength information may further include a check location. For the start location, the specified wavelength, the identifier of the specified wavelength, and the check location, refer to corresponding descriptions in the first aspect, and details are not described herein again.

In a possible design, the light source of the multiplexer/demultiplexer apparatus is a wavelength-adjustable light source. The wavelength-adjustable light source is configured to generate an optical signal indicating a specified wavelength.

In a possible design, the light source of the multiplexer/demultiplexer apparatus includes a plurality of light sources. The plurality of light sources are configured to generate optical signals indicating specified wavelengths, and the optical signals indicating the specified wavelengths cover bands that do not completely overlap.

In a possible design, the multiplexer/demultiplexer apparatus further includes a multiplexer. The multiplexer is configured to combine the plurality of optical signals generated by the plurality of light sources.

According to a fourth aspect, embodiments of this application provide a wavelength configuration method. The wavelength configuration method is applied to the wavelength configuration system according to the first aspect. The multiplexer/demultiplexer apparatus sends an optical signal to the electrical signal processing apparatus. The optical signal indicates a specified wavelength to be configured by the electrical signal processing apparatus. The electrical signal processing apparatus obtains the specified wavelength indicated by the optical signal. The electrical signal processing apparatus configures a wavelength of the optical transceiver interface connected to the multiplexer/demultiplexer apparatus in the electrical signal processing apparatus as the specified wavelength indicated by the optical signal.

In a possible design, the electrical signal processing apparatus obtains wavelength information carried in the optical signal. The wavelength information includes a start location and the specified wavelength, or the wavelength information includes a start location and the identifier of the specified wavelength. The wavelength information may further include a check location. For the start location, the specified wavelength, the identifier of the specified wavelength, and the check location, refer to corresponding descriptions in the first aspect, and details are not described herein again.

In a possible design, the multiplexer/demultiplexer apparatus includes a wavelength-adjustable light source. The wavelength-adjustable light source in the multiplexer/demultiplexer apparatus generates an optical signal indicating a specified wavelength.

In a possible design, the multiplexer/demultiplexer apparatus includes a plurality of light sources. The plurality of light sources of the multiplexer/demultiplexer apparatus generate optical signals indicating specified wavelengths. The optical signals indicating the specified wavelengths cover bands that do not completely overlap.

In a possible design, the multiplexer/demultiplexer apparatus further includes a multiplexer. The multiplexer in the multiplexer/demultiplexer apparatus combines the plurality of optical signals generated by the plurality of light sources.

According to a fifth aspect, embodiments of this application provide another wavelength configuration method. The wavelength configuration method is applied to the electrical signal processing apparatus according to the second aspect. The electrical signal processing apparatus receives an optical signal from a multiplexer/demultiplexer apparatus. The optical signal indicates a specified wavelength to be configured by the electrical signal processing apparatus. The electrical signal processing apparatus obtains the specified wavelength indicated by the optical signal. The electrical signal processing apparatus configures a wavelength of the optical transceiver interface connected to the multiplexer/demultiplexer apparatus in the electrical signal processing apparatus as the specified wavelength indicated by the optical signal.

According to a sixth aspect, embodiments of this application provide still another wavelength configuration method. The wavelength configuration method is applied to the multiplexer/demultiplexer apparatus according to the third aspect. The multiplexer/demultiplexer apparatus generates an optical signal, where the optical signal indicates a specified wavelength to be configured by the electrical signal processing apparatus. The multiplexer/demultiplexer apparatus sends the optical signal to the electrical signal processing apparatus.

According to a seventh aspect, embodiments of this application provide a wavelength configuration apparatus. The wavelength configuration apparatus may be a device or a chip or a circuit disposed in a device. The wavelength configuration apparatus includes a unit and/or module configured to perform the wavelength configuration method according to the fourth aspect, the fifth aspect, the sixth aspect, or any possible design of the three aspects, and therefore can also achieve beneficial effects of the wavelength configuration method according to the fourth aspect, the fifth aspect, the sixth aspect, or any possible design of the three aspects.

According to an eighth aspect, embodiments of this application provide a chip or a chip system. The chip or the chip system includes at least one processor and an interface, and the interface and the at least one processor are interconnected by using a line. The at least one processor is configured to run a computer program or instructions, to perform the method described in the fourth aspect, the fifth aspect, the sixth aspect, or any possible implementation of the three aspects.

DETAILED DESCRIPTION OF ILLUSTRATIVE EMBODIMENTS

Figure 1:
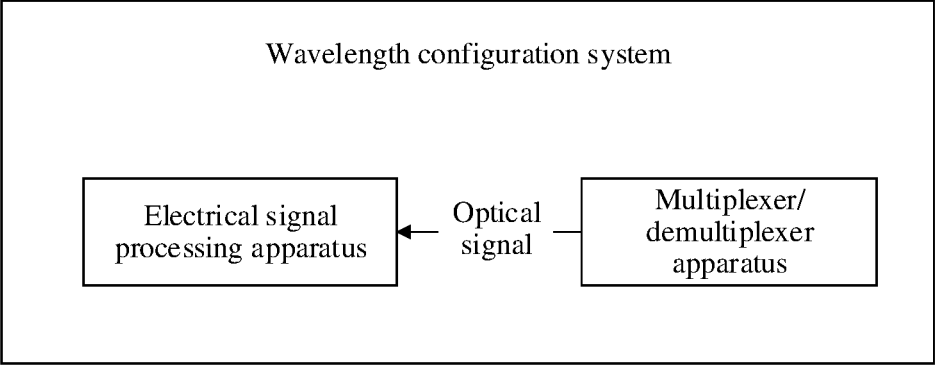
FIG. 1 is a schematic diagram of a wavelength configuration system according to an embodiment of this application.

The term "in an example" or "for example" in embodiments of this application means "used as an example, an illustration, or a description. Any embodiment or design scheme described as an "example" or "for example" in embodiments of this application should not be explained as being more preferred or having more advantages than another embodiment or design scheme. Exactly, use of the terms such as "example" or "for example" is intended to present a relative concept in a specific manner.

In this application, the term "a plurality of" means two or more. For example, a plurality of light sources refer to two or more light sources.

It should be understood that terms used in descriptions of the various examples in this specification are merely for describing specific examples and are not intended to impose limitations. As used in the description of the various examples and the appended claims, singular forms, "a" or "an" and "the", are intended to also include plural forms, unless the context clearly indicates otherwise.

It should be understood that, sequence numbers of the processes do not mean execution sequences in various embodiments of this application. The execution sequences of the processes should be determined based on functions and internal logic of the processes, and should not constitute any limitation on implementation processes of embodiments of this application.

It should be understood that determining B based on A does not mean that B is determined based on A only, but B may alternatively be determined based on A and/or other information.

It should be understood that the term "include" (also referred to as "includes", "including", "comprises", and/or "comprising"), when used in this specification, specifies the presence of stated features, integers, steps, operations, elements, and/or components, but does not preclude presence or addition of one or more other features, integers, steps, operations, elements, components, and/or groups thereof.

The following describes the technical solutions in embodiments of this application with reference to the accompanying drawings in embodiments of this application.

A dense wavelength division multiplexing (DWDM) technology may transmit a group of light of different wavelengths by using an optical fiber. Currently, a typical DWDM networking structure includes a wavelength division multiplexing system electrical board (such as an optical transport unit (OTU) board), a multiplexer/demultiplexer board, an optical supervisory channel (OSC) board, and the like. A line port wavelength of the wavelength division multiplexing system electrical board needs to be strictly consistent with a port wavelength of the multiplexer/demultiplexer board. Otherwise, services in a DWDM system cannot be connected. Therefore, during deployment and networking, it is necessary to manually configure the line port wavelength of the wavelength division multiplexing system electrical board and manually configure the port wavelength of the multiplexer/demultiplexer board connected to the wavelength division multiplexing system electrical board, to ensure correct optical fiber connections. Currently, the line port wavelength of the wavelength division multiplexing system electrical board depends on manual configuration. However, manually planning and manually connecting optical fibers have a high probability of errors.

To resolve the foregoing problem, embodiments of this application provide a wavelength configuration method. The method is applied to a wavelength configuration system. The wavelength configuration method implements automatic line port wavelength configuration of a wavelength division multiplexing system electrical board, and helps to complete wavelength configuration more quickly and accurately.

FIG. 1 is a schematic diagram of a wavelength configuration system according to an embodiment of this application. The wavelength configuration system shown in FIG. 1 includes an electrical signal processing apparatus and a multiplexer/demultiplexer apparatus. It should be noted that the wavelength configuration method according to this embodiment of this application is mainly implemented by the electrical signal processing apparatus and the multiplexer/demultiplexer apparatus. Therefore, the wavelength configuration system shown in FIG. 1 does not cover other modules. However, the wavelength configuration system described in FIG. 1 may be a DWDM system, in other words, include other boards, such as an OSC board, which is not limited in this embodiment.

The multiplexer/demultiplexer apparatus is configured to send an optical signal to the electrical signal processing apparatus, where the optical signal indicates a specified wavelength to be configured by the electrical signal processing apparatus. Only when wavelengths of an optical transceiver interface of the electrical signal processing apparatus and an optical transceiver interface of the multiplexer/demultiplexer apparatus are consistent, the electrical signal processing apparatus and the multiplexer/demultiplexer apparatus can normally establish an optical path, to transmit a service. The multiplexer/demultiplexer apparatus in this embodiment carries a specified wavelength by using an optical signal, to indicate that the electrical signal processing apparatus configures the specified wavelength.

Correspondingly, the electrical signal processing apparatus is configured to receive an optical signal from the multiplexer/demultiplexer apparatus, and is configured to obtain the specified wavelength indicated by the optical signal. For example, the electrical signal processing apparatus is configured to obtain wavelength information carried in the optical signal. In other words, the optical signal in this embodiment may be considered as a modulated optical signal that carries the wavelength information. The wavelength information indicates the specified wavelength or an identifier of the specified wavelength. For example, the wavelength information in this embodiment includes a start location and the specified wavelength, or the wavelength information includes a start location and the identifier of the specified wavelength.

Figure 2:
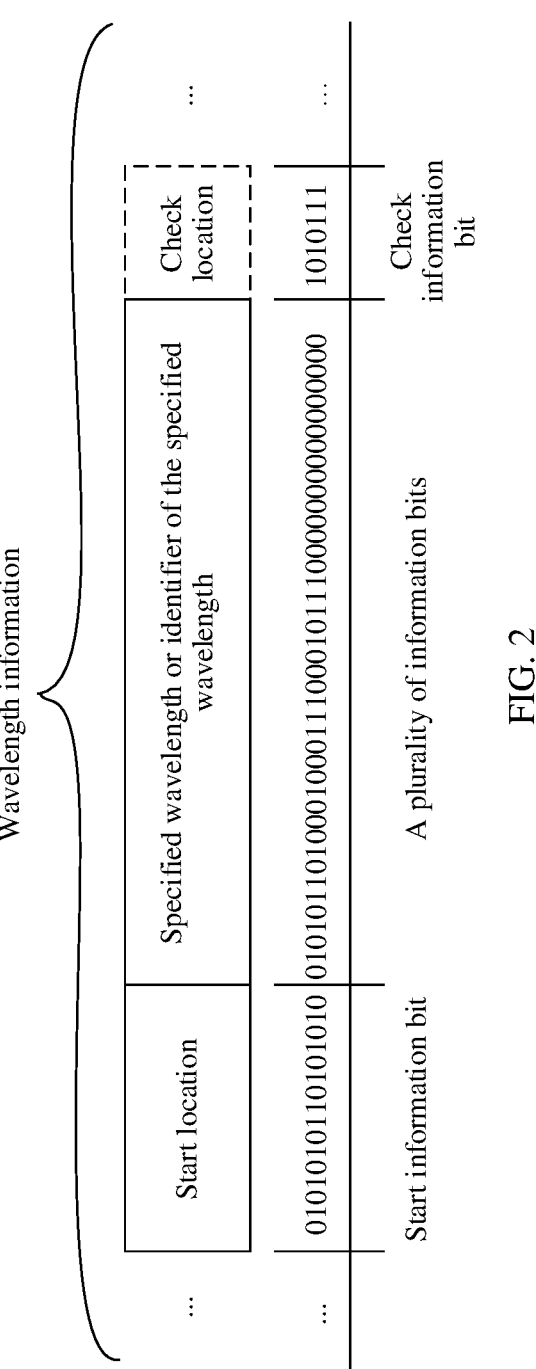
FIG. 2 is a schematic diagram of wavelength information according to an embodiment of this application.

For example, FIG. 2 is a schematic diagram of wavelength information according to an embodiment of this application. The wavelength information may be a plurality of information bits, for example, an entire character string such as 00110 in FIG. 2. In order to enable the electrical signal processing apparatus to identify a start location in the wavelength information, in this embodiment, the start location is set to four special consecutive information bits. For example, a start location in FIG. 2 is four special consecutive information bits (which may also be referred to as start information bits) of 0x55AA. In other words, when the electrical signal processing apparatus detects the start information bits of 0x55AA, the electrical signal processing apparatus determines that information bits after the start information bits of 0x55AA are information bits corresponding to a specified wavelength or an identifier of a specified wavelength.

The electrical signal processing apparatus obtains the specified wavelength or the identifier of the specified wavelength through decoding based on the plurality of information bits after the start information bits of 0x55AA in FIG. 2. For example, a specified wavelength indicated by the plurality of information bits after the start information bits in FIG. 2 obtained by the electrical signal processing apparatus through decoding is $\lambda_1$. For another example, the identifier of the specified wavelength indicated by the plurality of information bits after the start information bits in FIG. 2 obtained by the electrical signal processing apparatus through decoding is No. 5. Based on a preset correspondence between an identifier of a specified wavelength and a specified wavelength, the electrical signal processing apparatus determines that the specified wavelength is the specified wavelength $\lambda_1$ corresponding to the identifier No. 5.

Optionally, the plurality of information bits of the wavelength information further include four special consecutive information bits (which may also be referred to as end information bits) that indicate the end of the specified wavelength or the identifier of the specified wavelength. For example, four consecutive information bits of 0x0000 exist in the plurality of information bits of the wavelength information in FIG. 2, and indicate the end of the specified wavelength or the identifier of the specified wavelength. It should be understood that "1" in the foregoing information bits indicates that a light source in the multiplexer/demultiplexer apparatus is turned on and emits light, and "o" in the information bits indicates that the light source in the multiplexer/demultiplexer apparatus is turned off and does not emit light. The wavelength information is sent out by turning on (with light) or turning off (without light) the light source in the multiplexer/demultiplexer apparatus to generate an optical signal. Correspondingly, the electrical signal processing apparatus obtains the wavelength information by decoding based on the optical signal.

To improve reliability of transmission, the wavelength information may further include a check location. For example, the check location in FIG. 2 is also a plurality of check information bits, and the check information bits indicate that the electrical signal processing apparatus checks, in a specified check manner, information obtained by decoding.

It should be noted that the wavelength information shown in FIG. 2 is merely an example. The wavelength information in this embodiment may also be implemented in another manner. For example, a multiplexer/demultiplexer apparatus adjusts optical power of an optical signal, so that optical signals with different optical power carry wavelength information. The electrical signal processing apparatus receives optical signals with different optical power, and may also obtain specified wavelengths indicated by the optical signals. For another example, wavelength information may further be an indication frame, which is designed based on a specific frame format, and the indication frame carries wavelength information and check information.

The electrical signal processing apparatus is further configured to configure a wavelength of an optical transceiver interface connected to the multiplexer/demultiplexer apparatus in the electrical signal processing apparatus as the specified wavelength indicated by the optical signal. For example, if the electrical signal processing apparatus determines that the specified wavelength is $\lambda_1$, a wavelength of an optical transceiver interface connected to a multiplexer/demultiplexer apparatus is configured as $\lambda_1$.

It should be noted that the electrical signal processing apparatus and the multiplexer/demultiplexer apparatus in embodiments of this application may be deployed at a same site. For example, the electrical signal processing apparatus and the multiplexer/demultiplexer apparatus are deployed on a rack in a same equipment room, are deployed on different racks in a same equipment room, or are deployed in different equipment rooms. The electrical signal processing apparatus and the multiplexer/demultiplexer apparatus may also be deployed at different sites, which is not limited in this embodiment. The electrical signal processing apparatus and the multiplexer/demultiplexer apparatus are connected by using an optical fiber.

Figure 3:
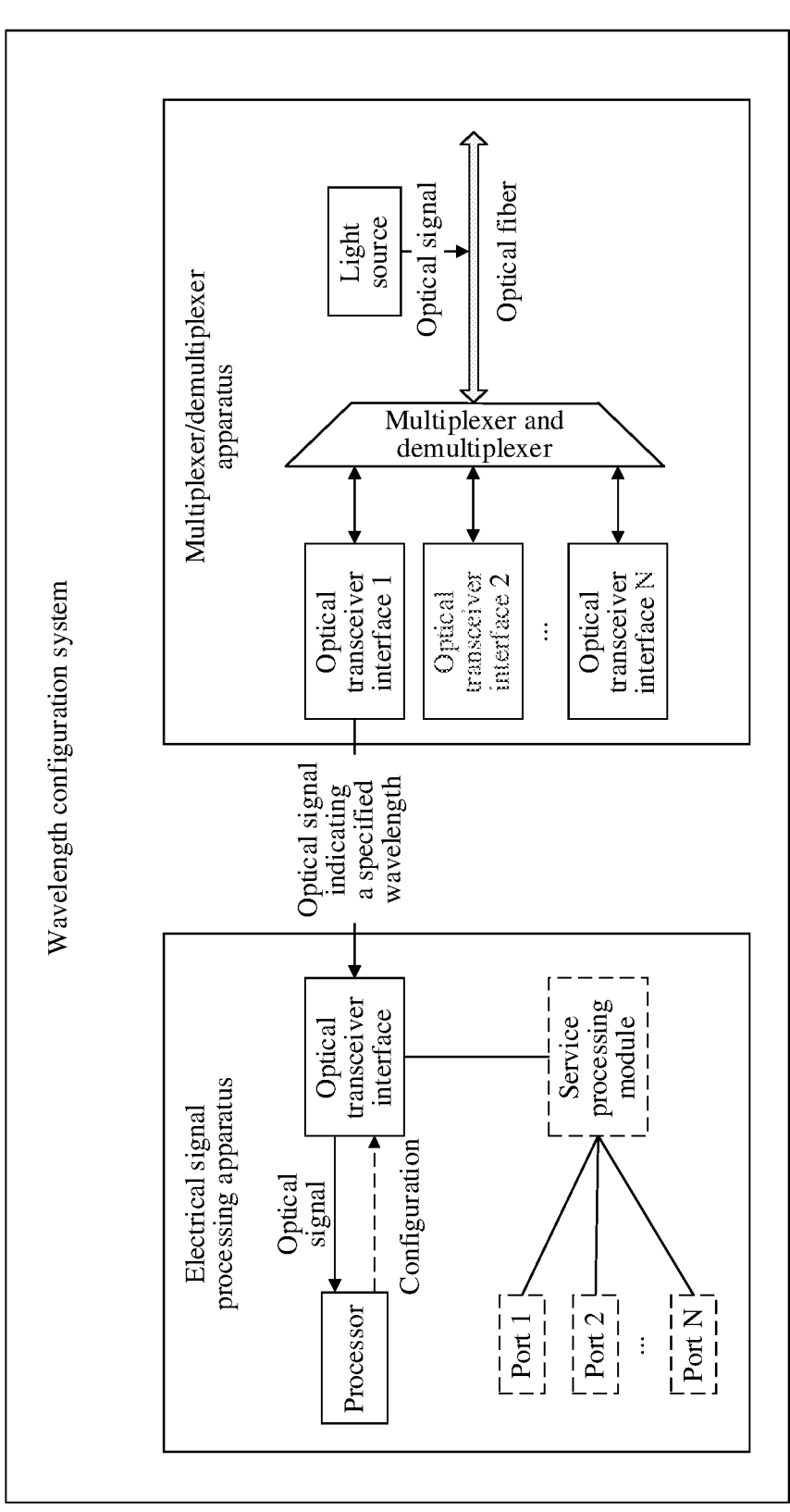
FIG. 3 is a schematic diagram of another wavelength configuration system according to an embodiment of this application.

In an example, the electrical signal processing apparatus is, for example, a DWDM electrical board in a DWDM system, or is, for example, an OTU board. Specifically, the electrical signal processing apparatus includes a processor and an optical transceiver interface, as shown in FIG. 3. The processor may be implemented by using a logic device (for example, field programmable gate array (FPGA)) or a central processing unit (CPU) system. For example, the electrical signal processing apparatus is an OTU board, and the optical transceiver interface may be a line port in the OTU board.

The optical transceiver interface is configured to receive an optical signal from the multiplexer/demultiplexer apparatus, and the optical signal indicates a specified wavelength to be configured by the electrical signal processing apparatus. The processor is configured to obtain the specified wavelength indicated by the optical signal. The processor is further configured to configure a wavelength of the optical transceiver interface connected to the multiplexer/demultiplexer apparatus in the electrical signal processing apparatus as the specified wavelength indicated by the optical signal. In a specific implementation, the logic device in the processor obtains wavelength information carried in the optical signal, and processes the wavelength information to obtain the specified wavelength. For related descriptions of the wavelength information, refer to corresponding descriptions in FIG. 2, and details are not described herein again.

Optionally, after the wavelength configuration of the optical transceiver interface of the electrical signal processing apparatus is successful, the optical transceiver interface sends light of a specified wavelength to the optical transceiver interface of the corresponding multiplexer/demultiplexer apparatus. For example, a wavelength of the optical transceiver interface in the electrical signal processing apparatus in FIG. 3 is configured as $\lambda_1$, and the optical transceiver interface sends light of a wavelength of $\lambda_1$ to an optical transceiver interface 1 connected to the optical transceiver interface and that is in the multiplexer/demultiplexer apparatus, indicating that the wavelength configuration of the optical transceiver interface of the electrical signal processing apparatus is successful.

In an implementation, the electrical signal processing apparatus is further configured to access various service signals (for example, a 10-gigabit/100-gigabit Ethernet (10GE/100GE) service and a synchronous digital hierarchy (SDH) service) and encapsulate the service signals as optical signals (such as an OTU signal) that satisfy the requirements of the DWDM system. Because the OTU signal is a color optical signal, the OTU signal may access a multiplexer/demultiplexer apparatus. When the electrical signal processing apparatus is configured to process various service signals, the electrical signal processing apparatus further includes a plurality of ports and a service processing module, as shown by a dashed line module in FIG. 3. For example, the electrical signal processing apparatus further includes ports 1 to N, where N is a positive integer greater than 1. The port 1 is configured to access an Ethernet service, the port 2 is configured to access an SDH service, and by analogy, the ports are configured to access different services or access no service. The service processing module is configured to encapsulate a service accessed by each port as an OTU signal. The service processing module transmits the OTU signal to the optical transceiver interface, and the optical transceiver interface sends the OTU signal to the multiplexer/demultiplexer apparatus. It should be noted that functions executed by the service processing module in FIG. 3 may also be implemented by a processor. In other words, the processor in FIG. 3 is configured to not only process the optical signal from the multiplexer/demultiplexer apparatus, but also process services from the plurality of ports.

In an example, the multiplexer/demultiplexer apparatus may be, for example, a multiplexer/demultiplexer board in the DWDM system. The multiplexer/demultiplexer board in the DWDM system is configured to combine color optical signals of different wavelengths to be transmitted in a same optical fiber. On the contrary, the multiplexer/demultiplexer board can split multiplexed light in a same optical fiber and send the split light to corresponding OTU boards through different optical ports.

The multiplexer/demultiplexer apparatus includes a light source, an optical transceiver interface, a multiplexer, and a demultiplexer, as shown in FIG. 3. The light source is configured to generate an optical signal, and the optical signal indicates a specified wavelength to be configured by the electrical signal processing apparatus. The optical transceiver interface is configured to send an optical signal to the electrical signal processing apparatus. The multiplexer/demultiplexer apparatus may include a plurality of optical transceiver interfaces. For example, the multiplexer/demultiplexer apparatus in FIG. 3 includes optical transceiver interfaces 1 to N. The optical transceiver interfaces 1 to N may be connected to a maximum of N electrical signal processing apparatuses, and the optical transceiver interfaces 1 to N need to access optical signals of specified wavelengths respectively. The multiplexer and demultiplexer are configured to combine a plurality of optical signals into one optical signal, or distribute one optical signal to a specified optical transceiver interface. For example, the light source in FIG. 3 generates an optical signal indicating a specified wavelength. The optical signal is distributed to the optical transceiver interface 1 through the multiplexer and demultiplexer, and is sent to an electrical signal processing module connected to the optical transceiver interface 1 through the optical transceiver interface 1. It should be noted that for the optical signal sent by the light source in FIG. 3, the multiplexer and demultiplexer implement functions of the demultiplexer.

Figure 4A:
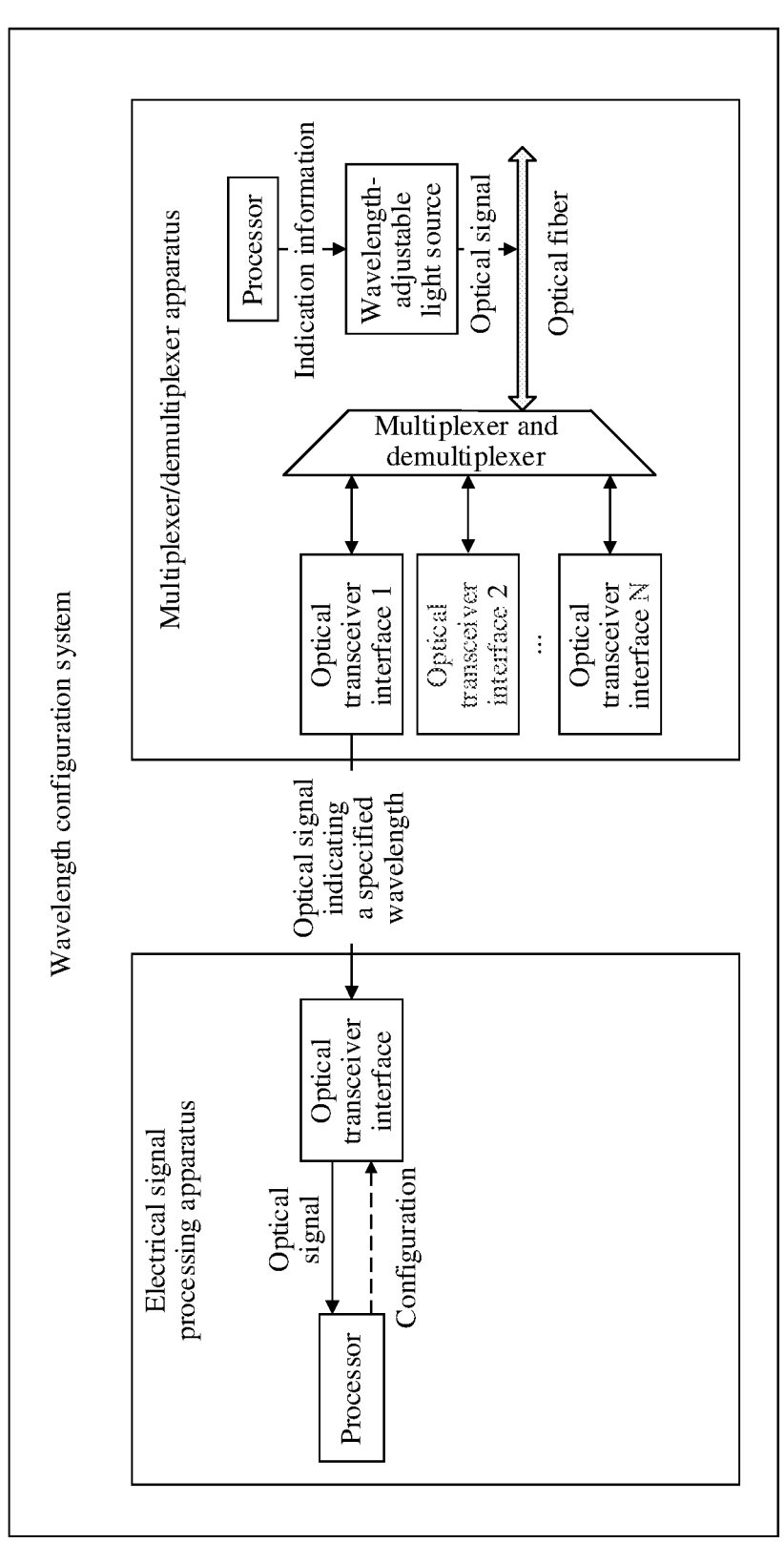
FIG. 4A is a schematic diagram of still another wavelength configuration system according to an embodiment of this application.

In an implementation, the light source is a wavelength-adjustable light source. The wavelength-adjustable light source is configured to generate an optical signal indicating a specified wavelength. For example, a multiplexer/demultiplexer apparatus shown in FIG. 4A includes a single wavelength-adjustable light source. The wavelength-adjustable light source may be a full-band adjustable laser. The wavelength-adjustable light source may be configured to send optical signals of different wavelengths to optical transceiver interfaces 1 to N by using a demultiplexer. Optionally, the multiplexer/demultiplexer apparatus shown in FIG. 4A further includes a processor. The processor is configured to generate different wavelength information for the optical transceiver interfaces 1 to N respectively, where the different wavelength information indicates different specified wavelengths, to distinguish the optical transceiver interfaces 1 to N. Similarly, the processor in the multiplexer/demultiplexer apparatus may also be implemented by using a logic device (such as an FPGA) or a CPU system.

In another implementation, the multiplexer/demultiplexer apparatus includes a plurality of light sources. The plurality of light sources are configured to generate optical signals indicating specified wavelengths. For example, a multiplexer/demultiplexer apparatus shown in FIG. 4B includes light sources 1 to 3, and each light source may be a wavelength-adjustable light source, or may be a wavelength-fixed light source, which is not limited in this embodiment. The light sources 1 to 3 respectively receive wavelength information 1 to 3 from the processor. For example, the light source 1 receives the wavelength information 1, and the wavelength information 1 indicates a specified wavelength $\lambda_1$. The light source 1 generates an optical signal 1 for indicating a specified wavelength $\lambda_1$ based on the wavelength information 1. By analogy, the light source 2 generates an optical signal 2 for indicating a specified wavelength $\Delta_2$ based on the wavelength information 2, and the light source 3 generates an optical signal 3 for indicating a specified wavelength $\Delta_3$ based on the wavelength information 3. Optionally, the multiplexer/demultiplexer apparatus further includes a single multiplexer, and the multiplexer is configured to combine the plurality of optical signals generated by the plurality of light sources. For example, the optical signals 1 to 3 respectively generated by the light sources 1 to 3 shown in FIG. 4B may be multiplexed by the multiplexer, and then input to an optical fiber (referred to as a main optical path) in the multiplexer/demultiplexer apparatus. The optical signals 1 to 3 enter a demultiplexer through the optical fiber, and the demultiplexer distributes the optical signals to corresponding optical transceiver interfaces.

Figure 4B:
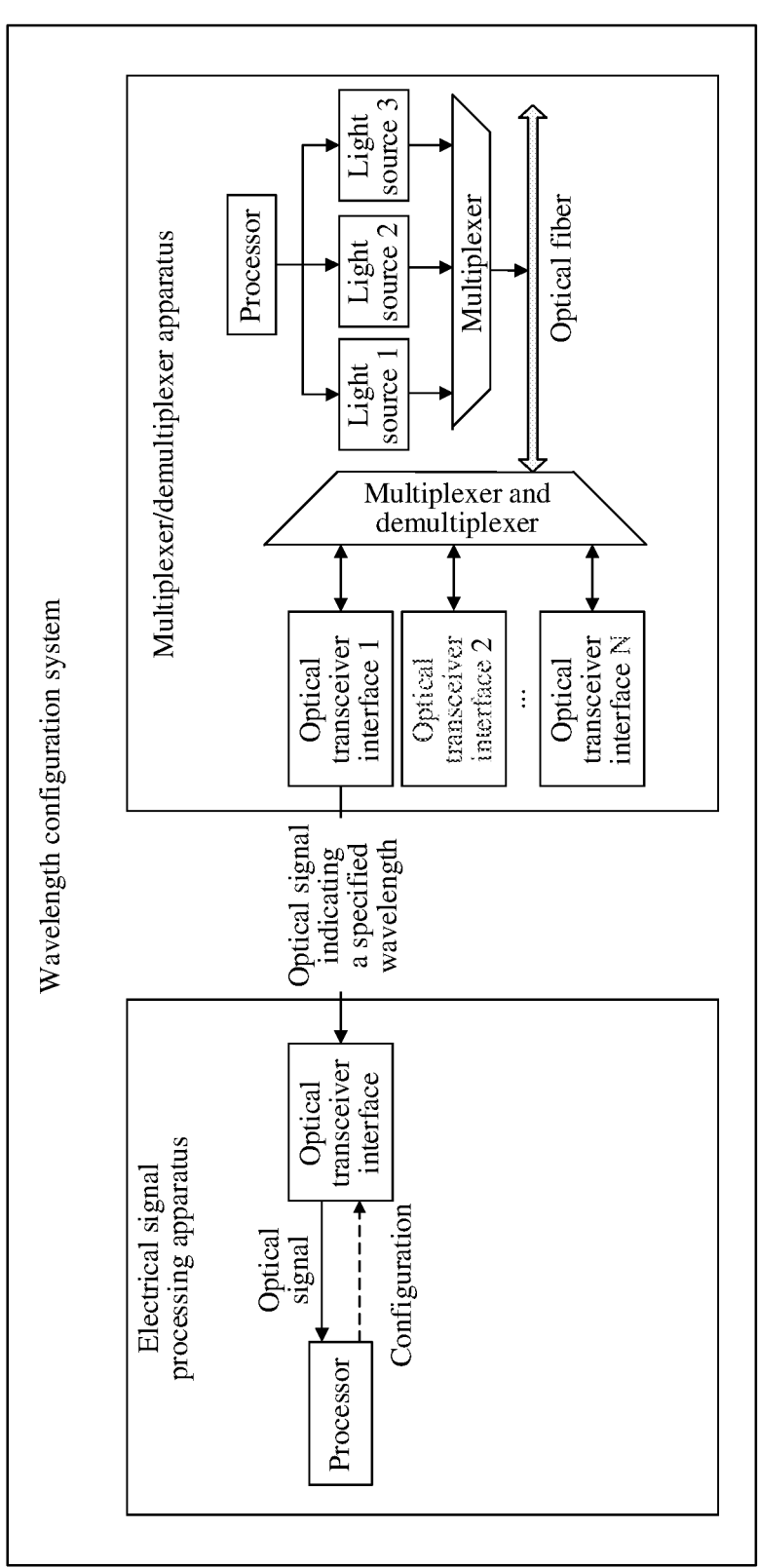
FIG. 4B is a schematic diagram of yet another wavelength configuration system according to an embodiment of this application.

Optionally, the optical signals generated by the plurality of light sources and indicating the specified wavelengths cover bands that do not completely overlap. For example, as shown in FIG. 4B, an optical signal generated by the light source 1 and indicating a specified wavelength covers a band C, an optical signal generated by the light source 2 and indicating a specified wavelength covers a band L, and an optical signal generated by the light source 3 and indicating a specified wavelength covers the band C and the band L. In this case, the light sources 1 to 3 can cover bands commonly used in the DWDM system. It should be noted that because the optical signal generated by the light source 3 and indicating the specified wavelength covers the band C and the band L, when the light source 1 or the light source 2 fails, the light source 3 may also serve as a backup of the light source 1 or the light source 2.

Embodiments of this application provide a wavelength configuration system. The wavelength configuration system includes an electrical signal processing apparatus and a multiplexer/demultiplexer apparatus. After receiving an optical signal sent by the multiplexer/demultiplexer apparatus, the electrical signal processing apparatus automatically configures a wavelength of a corresponding optical transceiver interface. The wavelength configuration system does not need a complex and error-prone manual configuration process, and completes wavelength configuration of the electrical signal processing apparatus more accurately in a shorter time.

Figure 5:
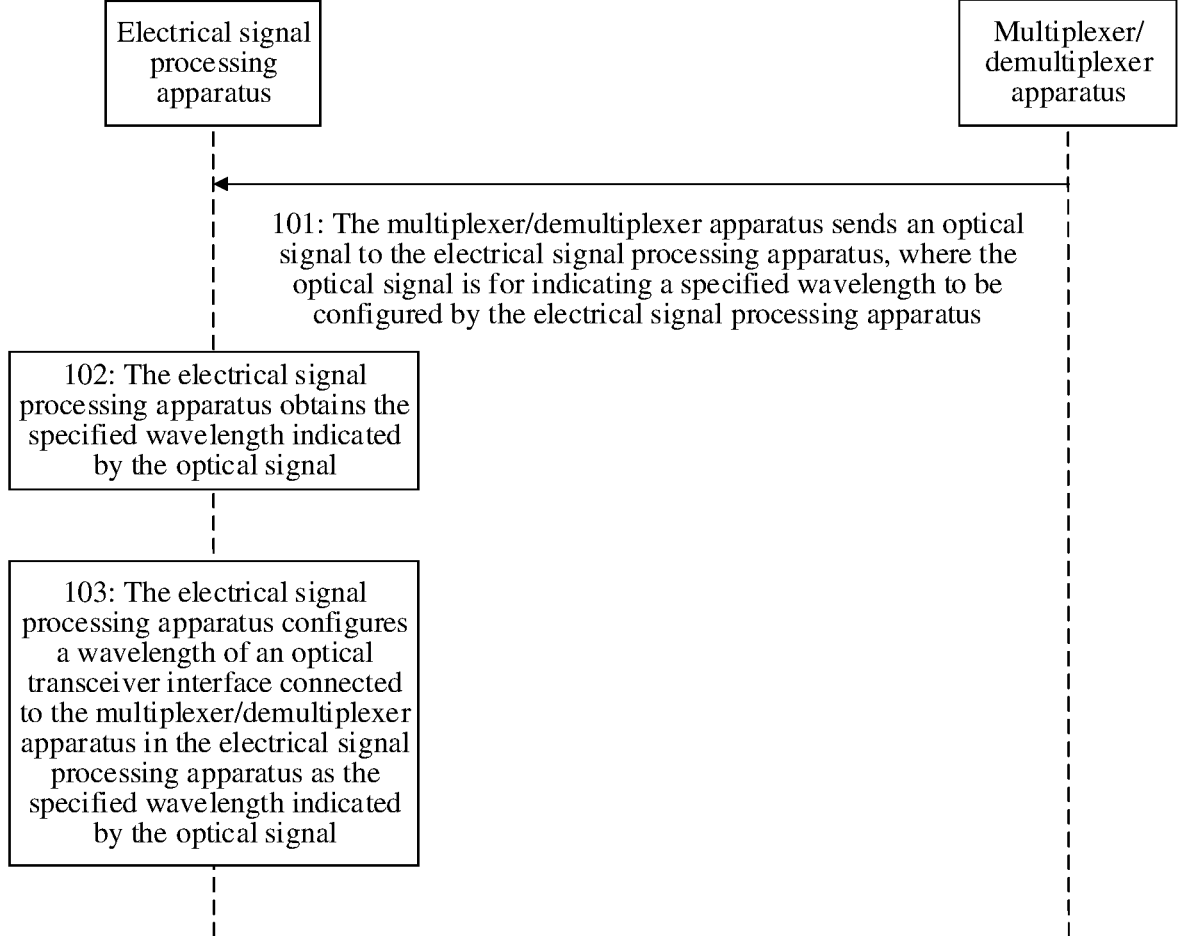
FIG. 5 is a schematic flowchart of a wavelength configuration method according to an embodiment of this application.

FIG. 5 shows a wavelength configuration method according to an embodiment of this application. The wavelength configuration method is applied to the wavelength configuration systems shown in FIG. 1 to FIG. 4B, is implemented by interaction between an electrical signal processing apparatus and a multiplexer/demultiplexer apparatus, and includes the following steps:

101: The multiplexer/demultiplexer apparatus sends an optical signal to the electrical signal processing apparatus, where the optical signal indicates a specified wavelength to be configured by the electrical signal processing apparatus.

102: The electrical signal processing apparatus obtains the specified wavelength indicated by the optical signal.

103: The electrical signal processing apparatus configures a wavelength of an optical transceiver interface connected to the multiplexer/demultiplexer apparatus in the electrical signal processing apparatus as the specified wavelength indicated by the optical signal.

In an implementation, a specific execution step that the electrical signal processing apparatus obtains the specified wavelength indicated by the optical signal is: The electrical signal processing apparatus obtains wavelength information carried in the optical signal. The wavelength information includes a start location and the specified wavelength, or the wavelength information includes a start location and the identifier of the specified wavelength. The wavelength information may further include a check location. For the start location, the specified wavelength, the identifier of the specified wavelength, and the check location, refer to corresponding descriptions in embodiments in FIG. 1 to FIG. 4B, and details are not described herein again.

In an implementation, before the multiplexer/demultiplexer apparatus sends the optical signal to the electrical signal processing apparatus, a wavelength-adjustable light source in the multiplexer/demultiplexer apparatus generates an optical signal indicating a specified wavelength.

In an implementation, before the multiplexer/demultiplexer apparatus sends the optical signal to the electrical signal processing apparatus, a plurality of light sources in the multiplexer/demultiplexer apparatus generate optical signals indicating specified wavelengths. Optionally, a multiplexer in the multiplexer/demultiplexer apparatus combines the plurality of optical signals generated by the plurality of light sources.

In conclusion, for specific execution processes and detailed descriptions in steps 101 to 103 and a plurality of implementations in the embodiment in FIG. 5, refer to corresponding descriptions in FIG. 1 to FIG. 4B, and details are not described herein again.

Embodiments of this application provide a wavelength configuration method. The wavelength configuration method is implemented by interaction between an electrical signal processing apparatus and a multiplexer/demultiplexer apparatus. The multiplexer/demultiplexer apparatus sends an optical signal indicating a specified wavelength to the electrical signal processing apparatus, and the electrical signal processing apparatus automatically configures a wavelength after receiving the optical signal. It can be learned that, in this wavelength configuration method, wavelength configuration is automatically completed without manual participation in configuration.

Figure 6:
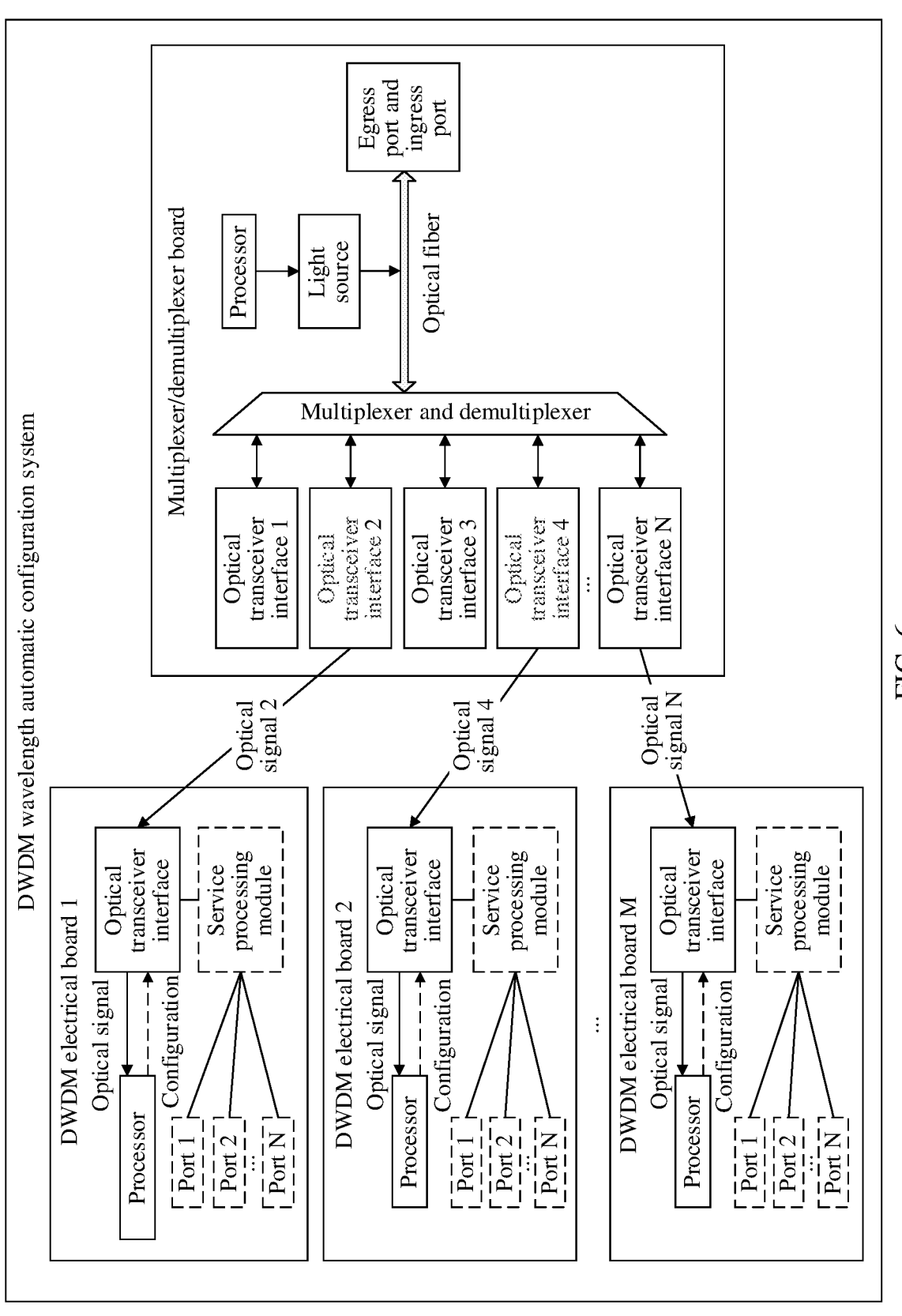
FIG. 6 is a schematic diagram of a DWDM wavelength automatic configuration system according to an embodiment of this application.

Based on the foregoing descriptions of the wavelength configuration systems and the wavelength configuration method provided in embodiments of this application in embodiments in FIG. 1 to FIG. 5, the following describes in detail an overall implementation process of the wavelength configuration method in a DWDM wavelength automatic configuration system. FIG. 6 is a schematic diagram of a DWDM wavelength automatic configuration system according to an embodiment of this application. The DWDM wavelength automatic configuration system shown in FIG. 6 includes M DWDM electrical boards and a multiplexer/demultiplexer board. In this embodiment, it is assumed that the DWDM electrical boards 1 to M (M≤N) may be connected to any M optical transceiver interfaces of the optical transceiver interfaces 1 to N of the multiplexer/demultiplexer board. A specific connection manner may be connection by using an optical fiber, or connection by using another optical waveguide material. The DWDM electrical boards shown in FIG. 6 have functions of the electrical signal processing apparatus shown in embodiments in FIG. 1 to FIG. 5. The multiplexer/demultiplexer board shown in FIG. 6 has functions of the multiplexer/demultiplexer apparatus shown in embodiments in FIG. 1 to FIG. 5.

The following describes specific steps in which the wavelength configuration method according to embodiments of this application is applied to the DWDM wavelength automatic configuration system shown in FIG. 6.

201: The multiplexer/demultiplexer board receives an automatic configuration start instruction, and starts to send, in a polling manner, optical signals for indicating specified wavelengths to the optical transceiver interfaces 1 to N.

202: A light source in the multiplexer/demultiplexer board generates an optical signal 1 for indicating a specified wavelength $\lambda_1$, and distributes the optical signal 1 to the optical transceiver interface 1 by using a multiplexer and a demultiplexer.

203: The optical transceiver interface 1 in the multiplexer/demultiplexer board sends the optical signal 1.

204: If no optical signal is detected within a specified timing period after the optical transceiver interface 1 in the multiplexer/demultiplexer board sends the optical signal 1, the multiplexer/demultiplexer board determines that the optical transceiver interface 1 is connected to no DWDM electrical board, and continues to poll a next optical transceiver interface.

205: The light source in the multiplexer/demultiplexer board generates an optical signal 2 for indicating a specified wavelength $\Delta_2$, and distributes the optical signal 2 to an optical transceiver interface 2 by using the multiplexer and the demultiplexer.

206: The optical transceiver interface 2 in the multiplexer/demultiplexer board sends the optical signal 2.

207: The DWDM electrical board 1 connected to the optical transceiver interface 2 receives the optical signal 2, and obtains the specified wavelength $\lambda_2$ indicated by the optical signal 2.

208: The DWDM electrical board 1 configures a wavelength of its own optical transceiver interface as the specified wavelength $\lambda_2$.

209: If an optical signal is detected within the specified timing period after the optical transceiver interface 2 in the multiplexer/demultiplexer board sends the optical signal 2, the multiplexer/demultiplexer board determines that the wavelength configuration of the DWDM electrical board 1 connected to the optical transceiver interface 2 is successful. The multiplexer/demultiplexer board continues to poll a next optical transceiver interface.

210: Based on step 201 to step 209, the rest can be deduced by analogy. If remaining optical transceiver interfaces in the multiplexer/demultiplexer board are connected to DWDM electrical boards, the remaining optical transceiver interfaces send optical signals for indicating specified wavelengths to the DWDM electrical boards connected to the remaining optical transceiver interfaces, until wavelength configuration of all the DWDM electrical boards that are connected to the optical transceiver interfaces on the multiplexer/demultiplexer board is successful. It should be understood that step 210 does not refer to a single step, but refers to a series of steps similar to step 201 to step 209. For specific implementations of step 201 to step 210, refer to corresponding descriptions in embodiments in FIG. 1 to FIG. 5. To avoid repetition, details are not described herein again.

In an implementation, the automatic configuration start instruction received by the multiplexer/demultiplexer board in step 201 may be a deployment instruction sent by a management device, and is used to instruct the DWDM wavelength automatic configuration system to activate services to enable wavelength automatic configuration. Optionally, after step 210 is completed, the multiplexer/demultiplexer board sends an automatic configuration complete instruction to the management device, to notify the management device that the DWDM wavelength automatic configuration system performs configuration successfully. After the configuration is completed, the DWDM wavelength automatic configuration system can implement related service functions.

In an implementation, a timer may be set in the multiplexer/demultiplexer board in step 204. When the multiplexer/demultiplexer board polls the optical transceiver interfaces 1 to N, the multiplexer/demultiplexer board uses the timer to poll the optical transceiver interfaces 1 to N based on the specified timing period. For example, a period of the timer that is set in the multiplexer/demultiplexer board is T. The timer starts timekeeping after an optical transceiver interface n ($1 \leq n \leq 1$) in the multiplexer/demultiplexer board sends an optical signal n. If an optical signal is detected by the optical transceiver interface n or an optical power detection device in the multiplexer/demultiplexer board detects optical power of a specified wavelength $\lambda_n$ within the period T, it indicates that wavelength configured of a DWDM electrical board connected to the optical transceiver interface n is successful. The optical transceiver interface n may detect an optical signal by using a photodiode (photodiode, PD). If no optical signal is detected by the optical transceiver interface n or the optical power detection device in the multiplexer/demultiplexer board does not detect the optical power of the specified wavelength $\lambda_n$ within the period T, it indicates that the optical transceiver interface n is connected to no DWDM electrical board.

Figure 7:
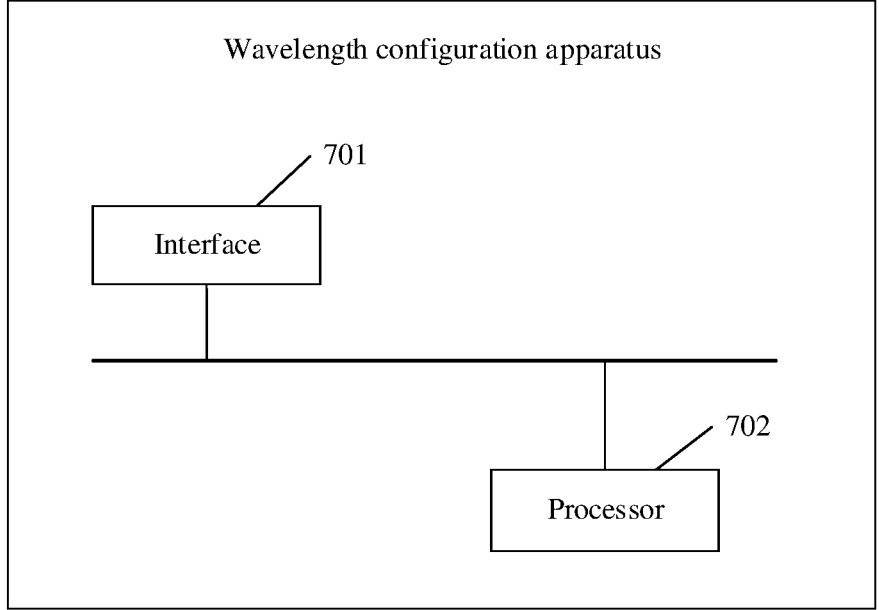
FIG. 7 is a schematic diagram of a wavelength configuration apparatus according to an embodiment of this application.

FIG. 7 is a schematic diagram of a wavelength configuration apparatus according to an embodiment of this application. The wavelength configuration apparatus shown in FIG. 7 can implement one or more steps in the method procedure of the embodiment in FIG. 5. To avoid repetition, details are not described herein again. The wavelength configuration apparatus includes an interface 701 and at least one processor 702. The interface 701 and the processor 702 may be connected to each other by using one or more communication buses or in another manner.

In an implementation, the interface 701 is configured to receive an optical signal or send an optical signal. For example, the interface 701 is an optical transceiver interface.

In an implementation, the processor 702 is configured to process the optical signal. For example, the processor is configured to obtain the specified wavelength indicated by the optical signal. The processor 702 may include one or more processors. For example, the processor 702 may be one or more central processing units (CPU), network processors (NP), hardware chips, or any combination thereof. When the processor 702 is one CPU, the CPU may be a single-core CPU, or may be a multi-core CPU.

Embodiments of this application provide a chip or a chip system. The chip or the chip system includes at least one processor and an interface. The interface and the at least one processor are interconnected by using a line. The at least one processor is configured to run a computer program or instructions, to perform the wavelength configuration method in embodiments of this application. The interface may be an input/output interface, a pin, a circuit, or the like.

The chip system in the foregoing aspects may be a system on chip (SOC), a baseband chip or the like, where the baseband chip may include a processor, a channel encoder, a digital signal processor, a modem, an interface module or the like.

All or a part of the foregoing embodiments may be implemented by software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedures, or functions based on embodiments of this application are all or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

A person of ordinary skill in the art may be aware that, the units and steps in the examples described with reference to embodiments disclosed herein may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions of each particular application, but it should not be considered that the implementation goes beyond the scope of this application.

What is claimed is:

1. A system, comprising:
an electrical signal processing apparatus comprising a first optical transceiver interface;
a multiplexer/demultiplexer apparatus comprising a second optical transceiver interface; and
at least one optical fiber connecting the first optical transceiver interface to the second optical transceiver interface;
wherein the multiplexer/demultiplexer apparatus is configured to:
send, via the second optical transceiver interface, an optical signal to the first optical transceiver interface of the electrical signal processing apparatus using the at least one optical fiber connecting the first optical transceiver interface to the second optical transceiver interface, wherein the optical signal indicates a first wavelength to be configured by the electrical signal processing apparatus for the first optical transceiver interface; and
receive, via the second optical transceiver interface, a service optical signal having the first wavelength from the first optical transceiver interface of the electrical signal processing apparatus using the at least one optical fiber connecting the first optical transceiver interface to the second optical transceiver interface; and
wherein the electrical signal processing apparatus is configured to:
obtain, via the first optical transceiver interface, the optical signal and determine the first wavelength indicated by the optical signal; and
configure, based on the first wavelength, a wavelength of the first optical transceiver interface of the electrical signal processing apparatus to be the first wavelength.

2. The system according to claim 1, wherein the electrical signal processing apparatus is configured to obtain wavelength information carried in the optical signal, wherein the wavelength information indicates the first wavelength or an identifier of the first wavelength.

3. The system according to claim 2, wherein:
the wavelength information comprises a start location and the first wavelength.

4. The system according to claim 2, wherein:
the wavelength information comprises a start location and the identifier of the first wavelength.

5. The system according to claim 2, wherein the wavelength information further comprises a check location.

6. The system according to claim 1, wherein the multiplexer/demultiplexer apparatus comprises a single wavelength-adjustable light source, and the wavelength-adjustable light source is configured to generate one or more optical signals that indicate one or more corresponding wavelengths.

7. The system according to claim 1, wherein the multiplexer/demultiplexer apparatus comprises a plurality of light sources, wherein the plurality of light sources are configured to generate a plurality of optical signals indicating corresponding wavelengths, and optical signals generated by different light sources in the plurality of light sources cover bands that do not completely overlap.

8. The system according to claim 7, wherein the multiplexer/demultiplexer apparatus further comprises a multiplexer, and the multiplexer is configured to combine the plurality of optical signals generated by the plurality of light sources.

9. The system according to claim 1, wherein the electrical signal processing apparatus is an optical transport unit (OTU) board, and the first optical transceiver interface is a line port in the OTU board.

10. An electrical signal processing apparatus, comprising:
a processor; and
a first optical transceiver interface connected to the processor, and connected to a second optical transceiver interface of a multiplexer/demultiplexer apparatus by at least one optical fiber, wherein the first optical transceiver interface is configured to:
receive an optical signal from the second optical transceiver interface of the multiplexer/demultiplexer apparatus using the at least one optical fiber, wherein the optical signal indicates a first wavelength to be configured by the electrical signal processing apparatus; and
send a service optical signal having the first wavelength to the second optical transceiver interface using the at least one optical fiber;
wherein the processor is configured to:
determine the first wavelength indicated by the optical signal; and
configure a wavelength of the first optical transceiver interface in the electrical signal processing apparatus that is connected to the second optical transceiver interface of the multiplexer/demultiplexer apparatus to be the first wavelength indicated by the optical signal for the first optical transceiver interface.

11. The apparatus according to claim 10, wherein the processor is configured to:
obtain wavelength information carried in the optical signal, wherein the wavelength information indicates the first wavelength or an identifier of the first wavelength.

12. The apparatus according to claim 11, wherein the wavelength information comprises a start location and the first wavelength.

13. The apparatus according to claim 11, wherein the wavelength information comprises a start location and the identifier of the first wavelength.

14. The apparatus according to claim 10, wherein the electrical signal processing apparatus is an optical transport unit (OTU) board, and the first optical transceiver interface is a line port in the OTU board.

15. A method, applied to a wavelength configuration system comprising an electrical signal processing apparatus and a multiplexer/demultiplexer apparatus, and the method comprising:

sending, by the multiplexer/demultiplexer apparatus, an optical signal via a first optical transceiver interface of the multiplexer/demultiplexer apparatus to a second optical transceiver interface of the electrical signal processing apparatus, wherein the optical signal indicates a first wavelength to be configured by the electrical signal processing apparatus for the second optical transceiver interface, and wherein the first optical transceiver interface of the multiplexer/demultiplexer apparatus is connected to the second optical transceiver interface of the electrical signal processing apparatus by at least one optical fiber;

receiving, by the first optical transceiver interface of the multiplexer/demultiplexer apparatus from the second optical transceiver interface of the electrical signal processing apparatus, a service optical signal having the first wavelength using the at least one optical fiber connecting the first optical transceiver interface to the second optical transceiver interface;

determining, by the electrical signal processing apparatus, the first wavelength indicated by the optical signal; and configuring, by the electrical signal processing apparatus, a wavelength of the second optical transceiver interface in the electrical signal processing apparatus that is connected to the multiplexer/demultiplexer apparatus by the at least one optical fiber to be the first wavelength indicated by the optical signal.

16. The method according to claim 15, wherein determining, by the electrical signal processing apparatus, the first wavelength indicated by the optical signal comprises:

obtaining, by the electrical signal processing apparatus, wavelength information carried in the optical signal, wherein the wavelength information indicates the first wavelength or an identifier of the first wavelength.

17. The method according to claim 15, further comprising:

generating, by a wavelength-adjustable light source in the multiplexer/demultiplexer apparatus, one or more optical signals indicating one or more corresponding wavelengths.

18. The method according to claim 15, further comprising:

generating, by a plurality of light sources of the multiplexer/demultiplexer apparatus, a plurality of optical signals indicating corresponding wavelengths, wherein the plurality of optical signals indicating the corresponding wavelengths cover bands that do not completely overlap.

19. The method according to claim 18, further comprising:

combining, by a multiplexer in the multiplexer/demultiplexer apparatus, the plurality of optical signals generated by the plurality of light sources.

20. The method according to claim 15, wherein the electrical signal processing apparatus is an optical transport unit (OTU) board, and the first optical transceiver interface is a line port in the OTU board.

* * * * *